US011368825B2

(12) United States Patent
Mendes et al.

(10) Patent No.: US 11,368,825 B2
(45) Date of Patent: *Jun. 21, 2022

(54) SYSTEM AND METHOD FOR MANAGING A FLEET OF VEHICLES INCLUDING ELECTRIC VEHICLES

(71) Applicant: Geotab Inc., Oakville (CA)

(72) Inventors: Christopher J. Mendes, Kitchener (CA); Alexander K. Koch, Guelph (CA); Michael Giannikouris, Kitchener (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/928,335

(22) Filed: Jul. 14, 2020

(65) Prior Publication Data
US 2020/0351629 A1 Nov. 5, 2020

Related U.S. Application Data

(63) Continuation of application No. 16/464,910, filed as application No. PCT/CA2017/051573 on Dec. 21, 2017, now Pat. No. 10,750,336.
(Continued)

(51) Int. Cl.
H04W 4/38 (2018.01)
H04W 4/44 (2018.01)
(Continued)

(52) U.S. Cl.
CPC ............... H04W 4/38 (2018.02); H04L 12/40 (2013.01); H04W 4/44 (2018.02);
(Continued)

(58) Field of Classification Search
CPC .......... H04W 4/38; H04W 4/44; H04L 12/40; H04L 2012/40215; H04L 2012/40273;
(Continued)

(56) References Cited

U.S. PATENT DOCUMENTS 8,682,525 B1 * 3/2014 Kalinadhabhotla .... G07C 5/008
701/36
8,742,915 B2 * 6/2014 Vassilieff ............ B60C 23/0408
340/447
(Continued)

FOREIGN PATENT DOCUMENTS

CN 104589933 A1 5/2015

OTHER PUBLICATIONS

International Search Report and Written Opinion for International Application No. PCT/CA2017/051573, dated Mar. 23, 2018.
(Continued)

Primary Examiner — Franklin D Balseca
(74) Attorney, Agent, or Firm — Wolf, Greenfield & Sacks, P.C.

(57) ABSTRACT

A method, device, and system for managing a fleet of vehicles is disclosed. The method includes providing a telematics device for an electric vehicle of the fleet of vehicles, the telematics device being capable of obtaining data from the electric vehicle; using the telematics device to identify the electric vehicle based on the data obtained from the electric vehicle; providing a data definition set for the electric vehicle to the telematics device; and using the telematics device and the data definition set to determine whether the electric vehicle is in a vehicle mode based on the data obtained from the electric vehicle and the data definition set. The vehicle mode of the electric vehicle can be at least one of a charging mode, a driving mode, and a parked mode.

17 Claims, 12 Drawing Sheets

Related U.S. Application Data

(60) Provisional application No. 62/438,192, filed on Dec. 22, 2016.

(51) Int. Cl.
   *H04L 12/40* (2006.01)
   *H04Q 9/00* (2006.01)

(52) U.S. Cl.
   CPC ............ *H04L 2012/40215* (2013.01); *H04L 2012/40273* (2013.01); *H04Q 9/00* (2013.01); *H04Q 2209/00* (2013.01); *H04Q 2209/10* (2013.01); *H04Q 2209/40* (2013.01); *H04Q 2209/70* (2013.01)

(58) Field of Classification Search
   CPC .. H04Q 9/00; H04Q 2209/00; H04Q 2209/10; H04Q 2209/40; H04Q 2209/70; H04Q 2209/80
   See application file for complete search history.

(56) References Cited

U.S. PATENT DOCUMENTS

| | | | | |
|---|---|---|---|---|
| 9,468,835 | B2* | 10/2016 | Martikka | A63B 71/06 |
| 9,635,518 | B2* | 4/2017 | Lee | H04Q 9/00 |
| 10,389,744 | B2* | 8/2019 | Hartkopp | H04L 63/1425 |
| 10,467,906 | B2* | 11/2019 | Fish | G08G 1/20 |
| 10,750,336 | B2* | 8/2020 | Mendes | B60L 53/665 |
| 11,051,143 | B2* | 6/2021 | Mendes | H04W 4/38 |
| 2004/0112124 | A1 | 6/2004 | Sonnenrein et al. | |
| 2007/0083303 | A1 | 4/2007 | O'Sullivan et al. | |
| 2012/0004804 | A1 | 1/2012 | Beams et al. | |
| 2013/0162221 | A1* | 6/2013 | Jefferies | B60L 53/63 320/155 |
| 2013/0275368 | A1* | 10/2013 | Camacho | G06Q 10/00 707/609 |
| 2014/0213238 | A1* | 7/2014 | Giraud | H04W 12/06 455/418 |
| 2015/0224891 | A1 | 8/2015 | Petrosian et al. | |
| 2015/0341862 | A1 | 11/2015 | Lei et al. | |
| 2016/0093216 | A1 | 3/2016 | Lee et al. | |
| 2019/0036946 | A1* | 1/2019 | Ruvio | H04W 4/44 |
| 2020/0015048 | A1 | 1/2020 | Mendes et al. | |

OTHER PUBLICATIONS

International Preliminary Report on Patentability for International Application No. PCT/CA2017/051573, dated Jun. 25, 2019.
Extended European Search Report for European Application No. 17883626.8, dated May 27, 2020.
U.S. Appl. No. 17/074,512, filed Oct. 19, 2020, Mendes et al.
PCT/CA2017/051573, Mar. 23, 2018, International Search Report and Written Opinion.
PCT/CA2017/051573, Jun. 25, 2019, International Preliminary Report on Patentability.
EP17883626.8, May 27, 2020, Extended European Search Report.

\* cited by examiner

SYSTEM AND METHOD FOR MANAGING A FLEET OF VEHICLES INCLUDING ELECTRIC VEHICLES

RELATED APPLICATIONS

This Application is a continuation of U.S. application Ser. No. 16/464,910, which is a national stage filing under 35 U.S.C. § 371 of International Patent Application Serial No. PCT/CA2017/051573, filed Dec. 21, 2017, titled "System And Method For Managing A Fleet Of Vehicles Including Electric Vehicles", by Mendes et al. which claims the benefit of U.S. Provisional Patent Application Ser. No. 62/438,192, filed Dec. 22, 2016, titled "System And Method For Managing A Fleet Of Vehicles Including Electric Vehicles", by Mendes et al. Each of these applications is incorporated herein by reference in their entirety.

TECHNICAL FIELD

The embodiments disclosed herein relate to electric vehicles, and, in particular to systems and methods for managing a fleet of electric vehicles.

INTRODUCTION

On-board diagnostics (OBD) is an automotive term referring to a vehicle's self-diagnostic and reporting capability. OBD systems give a vehicle owner or a repair technician access to the status of the various vehicle subsystems. Early versions of OBD (OBD1) would simply illuminate a malfunction indicator light if a problem was detected but would not provide any information as to the nature of the problem. Modern OBD implementations use a standardized digital communications port to provide real-time data in addition to a standardized series of diagnostic trouble codes (DTCs) which allow a user to rapidly identify and remedy malfunctions within the vehicle.

On-Board Diagnostics 2 (OBD2) is an improvement over OBD1 and the OBD2 standard specifies the type of diagnostic connector (e.g., an OBD2 Data Link Connector) and its pinout, the electrical signaling or communication protocols available, and the messaging format. The OBD2 standard also provides a candidate list of vehicle parameters to monitor along with how to encode the data for each.

The vehicle side of the OBD2 connector includes a pin in the connector that provides power for the scan tool from the vehicle battery, which eliminates the need to connect a scan tool to a power source separately.

The OBD2 standard provides a list of standardized Diagnostic Trouble Codes (DTCs). As a result of this standardization, a single device can query the on-board computer(s) for these parameters in any vehicle. OBD2 standardization was prompted to simplify diagnosis of increasingly complicated emissions equipment. Although only emission-related codes and data are required to be transmitted according to U.S. legislation, most manufacturers have made the OBD2 Data Link Connector the main connector in the vehicle through which all systems are diagnosed and reprogrammed.

OBD2 DTCs are 4-digits and preceded by a letter: P for engine and transmission (powertrain), B for body, C for chassis, and U for network. Manufacturers may also add custom data parameters to their specific OBD2 implementation, including real-time data requests as well as additional diagnostic trouble codes.

As the OBD2 standard is based in emission standards, electric vehicles may be particularly challenging for the OBD2 communication protocol to support. Further, the OBD2 standard is not legally mandated for electric vehicles. In most cases, electric vehicles do not support the OBD2 communication protocol.

Further, the OBD2 communication protocol, even where the OBD2 communication protocol is supported, may not contain electric vehicle data and information, such as battery state of charge (SOC) and energy consumption. Electric vehicle charging is a new vehicle state, where for gasoline, diesel, and propane vehicles (herein referred to as non-electric vehicles) there is only a driving state and an off state. Non-electric vehicles typically are 'on' while the engine is on. Tracking the vehicle "mode" of a non-electric vehicle can be trivial as the vehicle is either on if the engine revolutions per minute (RPM) is greater than zero (e.g., Engine RPM>0) or the vehicle is off.

Accordingly, there is a need for an improved system and method for managing a fleet of vehicles including electric vehicles.

SUMMARY

The various embodiments described herein generally relate to methods (and associated systems and apparatus configured to implement the methods) for managing a fleet of vehicles. The method for managing a fleet of vehicles includes providing a telematics device for an electric vehicle of the fleet of vehicles, the telematics device being capable of obtaining data from the electric vehicle; using the telematics device to identify the electric vehicle based on the data obtained from the electric vehicle; providing a data definition set for the electric vehicle to the telematics device; and using the telematics device and the data definition set to determine whether the electric vehicle is in a vehicle mode based on the data obtained from the electric vehicle and the data definition set. The vehicle mode of the electric vehicle can be at least one of a charging mode, a driving mode, and a parked mode.

In some embodiments, using the telematics device to identify the electric vehicle based on the date obtained from the electric vehicle can involve obtaining data from a serial network on-board the electric vehicle; comparing the data obtained from the serial network to a plurality of fingerprints stored on the telematics device to identify a matching fingerprint; identifying a vehicle identification instruction set corresponding to the matching fingerprint; and performing the vehicle identification instruction set corresponding to the matching fingerprint to obtain a vehicle identifier for the electric vehicle. Each of the plurality of fingerprints being stored in association with a vehicle identification instruction set.

In some embodiments, obtaining data from a serial network on-board the electric vehicle can involve obtaining data from a serial network on-board the electric vehicle for a pre-determined period of time.

In some embodiments, the data obtained from the serial network can include a CAN bus identifier and a payload of a CAN bus message. In at least one embodiment, the data obtained from the serial network further includes a payload filter of the CAN bus message.

In some embodiments, providing a data definition set for the electric vehicle to the telematics device can involve: providing a server, communicating a vehicle identifier for the electric vehicle from the telematics device to the server; locating the data definition set for the electric vehicle based on the vehicle identifier for the electric vehicle; and communicating the data definition set from the server to the telematics device. The server can storing a plurality of vehicle identifiers, the vehicle identifiers being stored in association with data definition sets.

In some embodiments, the data definition set can include at least one of a CAN bus signal definition and a request-response definition. The CAN bus signal definition can include at least one of a CAN bus identifier, a CAN bus message start bit, a CAN bus message end bit, a CAN bus message scaling factor, and a CAN bus message offset factor. The request-response definition can include at least one request parameter and an interpretation definition for the at least one request parameter.

In some embodiments, the method can further include in response to determining that the electric vehicle is in a charging mode, reducing a rate at which data is requested from the electric vehicle.

In some embodiments, the method can further include in response to determining that the electric vehicle is not in a driving mode, reducing a rate at which data is obtained from the electric vehicle.

In some embodiments, the method can further include in response to determining that the electric vehicle is in a charging mode, determining charge metrics including at least one of a battery state of charge and a battery power.

In some embodiments, the method can further include in response to determining that the electric vehicle is in a driving mode, determining trip metrics including at least one of a battery state of charge, a battery power, a vehicle speed, an odometer reading, and a fuel rate.

In another broad aspect, a telematics device for managing an electric vehicle can include: a connection port for obtaining data from the electric vehicle: a wireless communication interface for communicating with a server, a memory operably connected to a processor, and the processor. The server can store a plurality of vehicle identifiers in association with data definition sets. The memory can store a plurality of fingerprints and a plurality of vehicle identification instruction sets. Each fingerprint can be stored in association with a vehicle identification instruction set. The processor can be configured to: obtain data from the electric vehicle; identify the electric vehicle based on the data obtained from the electric vehicle; obtain a data definition set for the electric vehicle from the server; and determine whether the electric vehicle is in a vehicle mode based on the data obtained from the electric vehicle and the data definition set. The vehicle mode of the electric vehicle can be at least one of a charging mode, a driving mode, and a parked mode.

In some embodiments, the connection port can be an on-board diagnostics connection port.

In some embodiments, the processor configured to identify the electric vehicle based on the data obtained from the electric vehicle can include the processor configured to: obtain data from a serial network on-board the electric vehicle; compare the data obtained from the serial network to the plurality of fingerprints to identify a matching fingerprint; identify a vehicle identification instruction set corresponding to the matching fingerprint; and perform the vehicle identification instruction set corresponding to the matching fingerprint to obtain a vehicle identifier for the electric vehicle. Each of the plurality of fingerprints can be stored in association with a vehicle identification instruction set.

In another broad aspect, a system for managing a fleet of vehicles can include a server and a telematics device for an electric vehicle of the fleet of vehicles. The server can store a plurality of vehicle identifiers in association with data definition sets. The telematics device can be in communication with the server. The telematics device can have a connection port for obtaining data from the electric vehicle, a memory operably connected to a processor, and the processor. The memory can store a plurality of fingerprints and a plurality of vehicle identification instruction sets. Each fingerprint can be stored in association with a vehicle identification instruction set. The processor can be configured to: obtain data from the electric vehicle; identify the electric vehicle based on the data obtained from the electric vehicle; obtain a data definition set for the electric vehicle from the server; and determine whether the electric vehicle is in a vehicle mode based on the data obtained from the electric vehicle and the data definition set. The vehicle mode of the electric vehicle can be at least one of a charging mode, a driving mode, and a parked mode.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
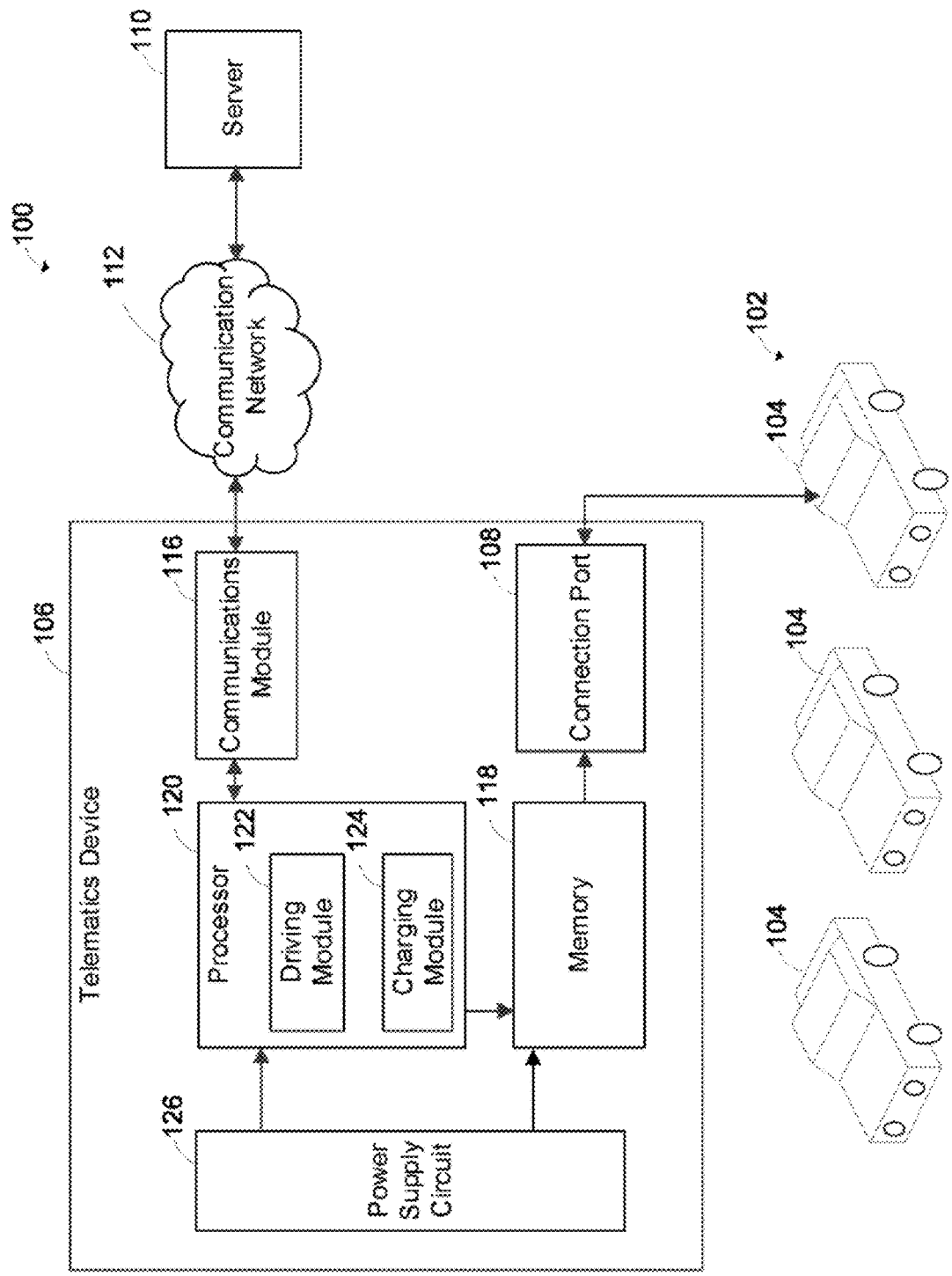
FIG. 1 is a block diagram of a system for managing a fleet of electric vehicles, in accordance with an embodiment.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Referring to FIG. 1, illustrated therein is a system 100 for managing a fleet 102 of vehicles 104, in accordance with an embodiment. The system 100 includes at least one telematics device 106 in data communication over a communication network 112 with a server 110. A telematics device 106 can be provided for each vehicle 104 that is managed by the system 100.

The server 110 can receive data from the telematics device 106 and provide instructions to the telematics device 106 via communication network 112. The server 110 can include a storage unit, a processor, and a communication interface (not shown in FIG. 1). The server can store, in the storage unit, a plurality of data definition sets. The data definition sets can define how vehicle signals are encoded. The data definition sets can be used to configure the telematics device 106 for decoding vehicle signals. The plurality of data definition sets form a vehicle signal configuration management system (VSIG), which is generally too large to store locally on a telematics device 106.

The communication network 112 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the telematics device 106 and the server 110.

The fleet 102 of vehicles 104 includes at least one electric vehicle. The term "electric vehicle" used herein broadly refers to any vehicle having an electric power train, that is, motive power provided by an electric motor and an energy storage component. It will be understood that the term "electric vehicle" used herein includes "hybrid vehicles" having both an electric power train and an internal combustion engine.

The fleet 102 can also include non-electric vehicles. The term "non-electric vehicles" used herein broadly refers to vehicles whose only source of motive power is provided by an internal combustion engine. Non-electric vehicles can include, but is not limited to, gasoline, propane, and diesel vehicles. The fleet 102 may include a plurality of electric vehicles 104 that replace non-electric vehicles.

The fleet 102 is shown having three vehicles 104 for illustrative purposes, however, the fleet 102 is not limited to three vehicles 104. Any number of vehicles 104 can be included in the fleet 102.

Furthermore, only one vehicle 104 of fleet 102 is shown having a telematics device 106 for illustrative purposes, however, more than one vehicle 104 of a fleet 102 can have a telematics device 106. That is, a system 100 can manage a portion of the fleet 102 of vehicles. For example, a system 100 may only manage electric vehicles of a fleet 102 and not manage non-electric vehicles of the fleet 102. In at least one embodiment, an entire fleet 102 can be managed by one system 100.

The telematics device 106 can include a connection port 108 for connecting to the vehicle, a memory 118, a processor 120, a communications module 116 for communicating with a communications network, and a power supply circuit 126.

The telematics device 106 can be connected to the vehicle 104 via the connection port 108. The connection port 108 can be an OBD2 port. The connection port 108 can provide access to OBD2 communication data and/or non-BD2 communication data, that is, data that does not use the OBD2 communication protocol. Non-OBD2 communication protocols include, but are not limited to, broadcast serial runtime data or the unified diagnostics system (UDS) protocol. Non-BD2 communication data can include electric vehicle specific data.

In at least one embodiment, the telematics device 106 can be a purpose built computer having the processor 120 and the memory 118 therein. The processor 120 can be any suitable processors, controllers, or digital signal processors that can provide sufficient processing power, depending on the configuration, purposes, and requirements of the telematics device 106. In at least one embodiment, the processor 120 can include more than one processor, with each processor configured to perform different dedicated tasks.

The processor 120 can be configured to obtain data from the vehicle 104 when the telematics device 108 is connected to the vehicle 104. In some embodiments, the processor 120 can obtain data from a serial network on-board the vehicle via the connection port 108. The serial network on-board the vehicle 104 can be a Controller Area Network (CAN) bus. The CAN bus is a standard vehicle bus that allows microcontrollers and devices on a vehicle to communicate with each other in applications without a host computer. The CAN bus protocol is a message-based protocol, designed originally for multiplex electrical wiring within automobiles, but may also be used in other contexts.

The memory 118 is operably connected to the processor 120. The memory 118 can be a non-transitory computer-readable storage medium. The memory 118 can be configured to store instructions executable by the processor 120 to perform at least one of the methods described herein. The memory 118 can also store a plurality of fingerprints and a plurality of vehicle identification instruction sets. Each fingerprint can be stored in association with a vehicle identification instruction set. A fingerprint can include a CAN bus identifier and a payload for a CAN bus message. A fingerprint can also include a payload filter for the CAN bus message.

The processor 120 can compare the data obtained from the vehicle 104 to the plurality of fingerprints stored in memory 118 to identify a fingerprint that matches the data obtained from the vehicle 104. The identification of a matching fingerprint is described in more detail below. The processor 120 can determine a vehicle identification instruction set that corresponds to the fingerprint identified by the data obtained from the vehicle 104. That is, based on the captured data, the processor 120 can determine a vehicle identification instruction set for the vehicle 104 from the plurality of vehicle identification instruction sets.

The processor 120 can execute instructions to carry out the vehicle identification instruction set in order to identify the vehicle 104. The vehicle identification instruction set can include one or more instructions to identify the vehicle 104. In at least one embodiment, the vehicle 104 can be identified by a vehicle identification number (VIN) and the vehicle instruction set can include an instruction to retrieve the VIN. The VIN can be unique for each vehicle 104. That is, no two vehicles 104 can have the same VIN.

The processor 120 can determine a vehicle mode of the electric vehicle 104. The determination of a vehicle mode is described in more detail below. The vehicle mode can be any one or more of the following: a charging state, a driving state, an off state, and an idling state. As electric vehicles 104 also include a charge mode, the processor 120 can determine if the vehicle 104 is charging or driving. The processor 120 can "mode" along with the vehicle 104 such that charging events are tracked separately than driving events. The processor 120 can also identify if the vehicle 104 is: (i) plugged in but not charging, or (ii) plugged in and charging.

The processor 120 includes a driving module 122 for determining if the electric vehicle 104 is driving. The processor 120 includes an charging module 124 for determining if the electric vehicle 104 is charging. Each of these modules are described in more detail below.

The telematics device 106 includes a communications module 116 for communicating with the server 110 via the communication network 112. The telematics device 106 can provide local vehicle data to the server 110. The telematics device 106 can receive central vehicle data from the server 110. The local vehicle data can include data from a vehicle's serial network. The local vehicle data can also include a vehicle identifier of the vehicle 104. The local vehicle data can be used to determine a mode of operation of the electric vehicle 104.

The server 110 communicates via a wireless network 112 with the communications module 116 of the telematics device 106. The server 110 can receive local vehicle data from the telematics device 106. The server 110 can provide central vehicle data to the telematics device 106. The central vehicle data can include vehicle signal encoding definition data (VSIG) for the telematics device 106 to use for decoding data from a vehicle's serial network. The central vehicle data can also include vehicle diagnostic data for the telematics device 106 to use for determining a mode of the electric vehicle 104.

The power supply circuit 126 provides power to circuit components of the telematics device 106 including the processor 120 and memory 118.

Figure 2:
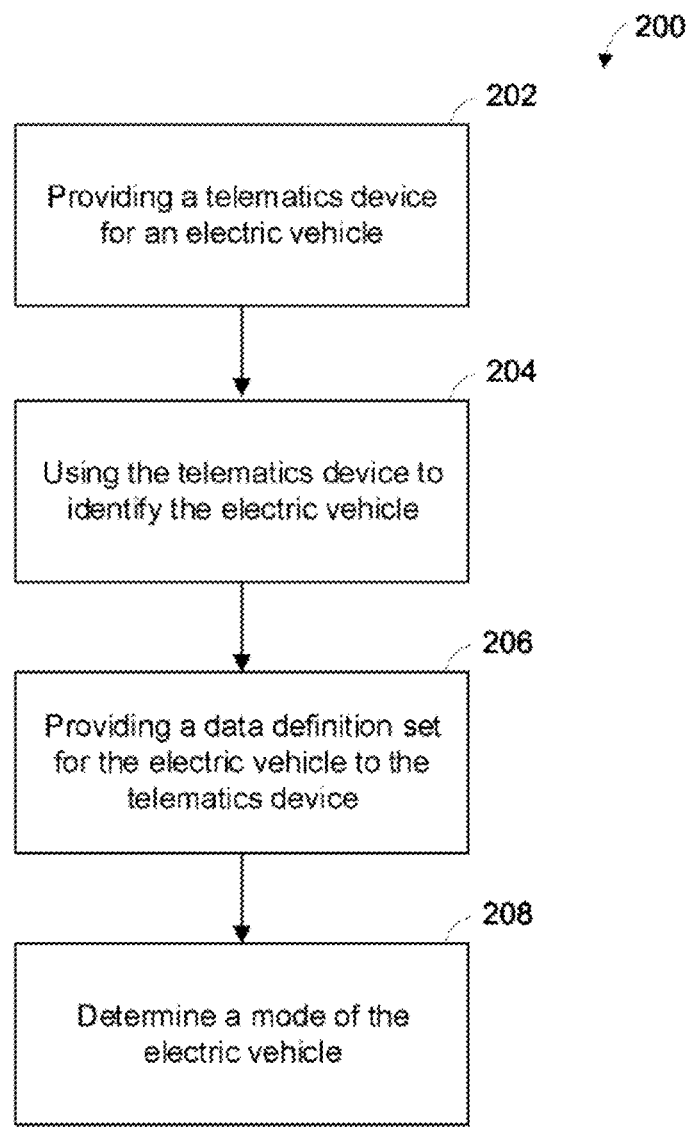
FIG. 2 is a flow chart of a method for managing a fleet of electric vehicles, in accordance with an embodiment.

Turning now to FIG. 2, illustrated therein is a method 200 for managing a fleet 102 of electric vehicles 104, in accordance with an embodiment. The method 200 includes providing 202 a telematics device 106 for an electric vehicle 104, using 204 the telematics device 106 to identify the electric vehicle 202, providing a data definition set for the electric vehicle 104 to the telematics device 106, and determining 208 a mode for the electric vehicle 104.

The method 200 begins with providing 202 a telematics device 106 for an electric vehicle 104 of the fleet 102. A telematics device 106 can be provided for more than one electric vehicle 104 of the fleet 102. The telematics device 106 can be installed in the electric vehicle 104 by connecting the connection port 108 to an connector in the electric vehicle 104. When the connector in the vehicle 104 is an OBD2 Data Link Connector, the connection port 108 can be an OBD2 connector. In at least one embodiment, the data obtained from the electric vehicle 104 can be stored in the telematics device 106.

As the OBD2 communication protocol may not be supported by electric vehicles, standard OBD2 VIN retrieval methods may also not be supported. Instead, the electric vehicle 104 can be automatically identified at 204 using data obtained from the vehicle's serial network without user input. The data obtained from the vehicle's serial network can be referred to as a "fingerprint" because it can be used to identify the vehicle.

In some embodiments, the telematics device 106 can generate a list of candidate vehicle makes and models and use the fingerprint to identify the vehicle's make and model from the list of candidates. In some embodiments, the fingerprint can be used to select a vehicle identification instruction set that, when performed, can identify the vehicle. In some embodiments, the identity of the vehicle 104 can be represented by a vehicle identification number (VIN) and the vehicle identification instruction set can retrieve the VIN from the electric vehicle 104. The instruction set to identify a vehicle can vary for each make, model, and/or year.

In some vehicles, the vehicle identifier is periodically broadcast on the serial network. The vehicle identification instruction set can set out various ways for listen for such broadcasts since they can vary with each make, model, and year of vehicle. The vehicle identification instruction set can also set out various way to request the vehicle identifier from vehicles that do not have broadcast the vehicle identifier.

Finally, the selected vehicle identification instruction set can be performed to identify the electric vehicle 104. In some embodiments, the vehicle identification instruction set is performed to determine the VIN. The execution of the vehicle identification instruction set can be the first interaction that the telematics device 106 has with the vehicle 104. Furthermore, the execution of the vehicle identification instruction set can be the only interaction that the telematics device 106 has with the vehicle 104 prior to receiving a data definition set at 206, which allows the telematics device 106 to decode data obtained from the vehicle 104.

Electric vehicle data can be stored in different locations within the electric vehicle, depending on the vehicle make, model, and/or year. Obtaining a data definition set at 206 can involve retrieving information about signals that are encoded for that vehicle. In some embodiments, each data definition set is a specific to a particular vehicle, such as for a particular VIN. In some embodiments, data definition sets are specific to a vehicle make, model, and year, or any combination of the vehicle make, model, and/or year.

The data definition set is retrieved from the server 110, which stores a plurality of data definition sets, that is, the vehicle signal configuration management system (VSIG). The VSIG stores a data definition set for each potential vehicle. Further, a VSIG that is remote from the telematics device 106 can allow the VSIG to be dynamically updated when new vehicles or configurations are created or modified. Generally, the VSIG includes a data definition set for each vehicle make, model, and year. Once the vehicle 104 identity is known by the telematics device 106, the telematics device 106 can provide the vehicle identity to the server 110. The server 110 can access the VSIG to provide the data definition set corresponding to the vehicle 104 to the telematics device 106.

In some embodiments, the telematics device 106 provides information identifying the vehicle that is sufficient for obtaining a data definition set. For example, when data definition sets are specific to the combination of vehicle make, model, and year, the telematics device 106 can provide the vehicle make, model, and year. In contrast, in some embodiments, the telematics device 106 can provide information identifying a specific vehicle, such as a VIN and the server 110 can determine the vehicle make, model, and year, based on the VIN provided, in order to select the appropriate data definition set.

At 208, the telematics device 106 can use the data definition set to decode data obtained from the serial network on-board the vehicle 104. The decoded data can be used to determine a mode of the electric vehicle 104. For example, the decoded data can be used to determine if the electric vehicle 104 is charging or driving. In at least one embodiment, information about whether the electric vehicle 104 is charging or driving vehicle can be used to track operating performance.

Figure 3:
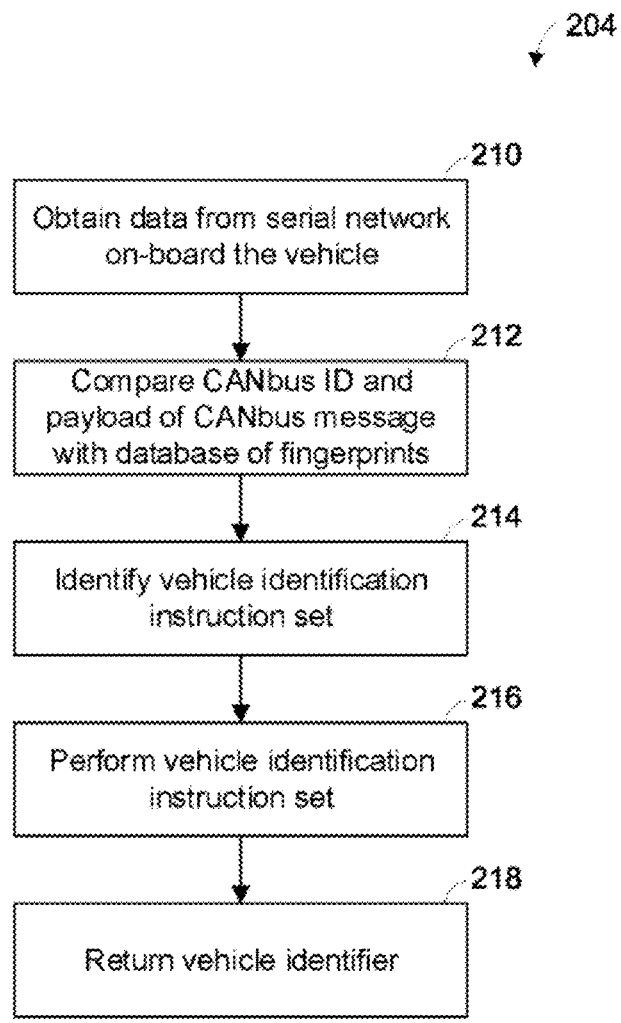
FIGS. 3 to 5 are a flow charts of a method for fingerprinting an electric vehicle, in accordance with an embodiment.

Turning now to FIG. 3, illustrated therein is a method 204 for using the telematics device 106 to identify 204 an electric vehicle 104, in accordance with an embodiment. The method 204 can identify the electric vehicle 104. The method 204 occurs within the in-vehicle hardware such as the telematics device 106, without the need for a third party or a server connection. The telematics device 106 stores a plurality of fingerprints and associated vehicle identification information sets in the onboard memory 118.

Fingerprints may include a set of CAN message identifiers, a payload of a specific message identifiers, a combination of payloads across multiple message identifiers (i.e., VIN), and/or a cyclic rate of transmission for each defined message identifier. Each electric vehicle 104 has a unique fingerprint. For example, a vehicle 104 may have approximately 100 unique CAN message identifiers present on its CAN network, that is, an serial network onboard the vehicle, at any given time. A subset of these messages and message payloads are identified as sufficient to identify this vehicle uniquely compared to all other vehicles.

At 210, data from the vehicle's serial network can be obtained. That is, a vehicle's fingerprint is obtained. Data is obtained from the serial network for a predetermined period time. In at least one embodiment, data on the vehicle's serial network can be captured longer than required in order to ensure sufficient data is captured. For example, the predetermined period of time can be up to 3 times longer than the time required to capture sufficient data to form fingerprint. That is, the predetermined period of time can be 3 times the maximum nominal broadcast rate defined in the fingerprint. In at least one embodiment, the predetermined period of time can be 5 seconds.

In at least one embodiment, the captured data can be stored on the memory 118 of the telematics device 106.

At 212, the captured data, that is the captured fingerprint, can be compared to the plurality of fingerprints stored in the memory 118 of the telematics device 106. The plurality of fingerprints stored in the memory 118 can include CAN bus identifiers, message payloads, and payload filters. An example of a portion of a plurality of fingerprints stored on the telematics device 106, is provided in Table A. Table A is shown for illustrative purposes only. For example, other fingerprints may include additional CAN bus message information and/or may not include the message payload mask

TABLE A

| Message ID | Nominal Broadcast Rate (ms) | Message Payload Mask | Message Payload Match |
| --- | --- | --- | --- |
| 0x104 | 10 | 00 FF FF 00 00 00 00 00 | 00 22 44 00 00 00 00 00 |
| 0x200 | 100 | | |
| 0x2EE | 100 | | |
| 0x24A | 100 | | |
| 0x700 | 1000 | | |

Each fingerprint in the database can have a predefined corresponding vehicle identification instruction set. At 214, the captured fingerprint is matched with one or more fingerprints to select a vehicle identification instruction set that corresponds to the captured data.

At 216, the selected vehicle identification instruction set is performed.

At 218, a valid vehicle identifier is determined. In some embodiments, the vehicle identifier can be a specific to the vehicle, such as a VIN. In some embodiments, the vehicle identifier can be a combination of the vehicle make, model, and year.

It will be understood that while the method shown in FIG. 3 has been described in relation to an electric vehicle, it is also applicable to non-electric vehicles. That is, the method of automatically identifying a vehicle can be used to automatically identify any vehicle having a serial network from which CAN bus messages can be obtained.

Figure 4:
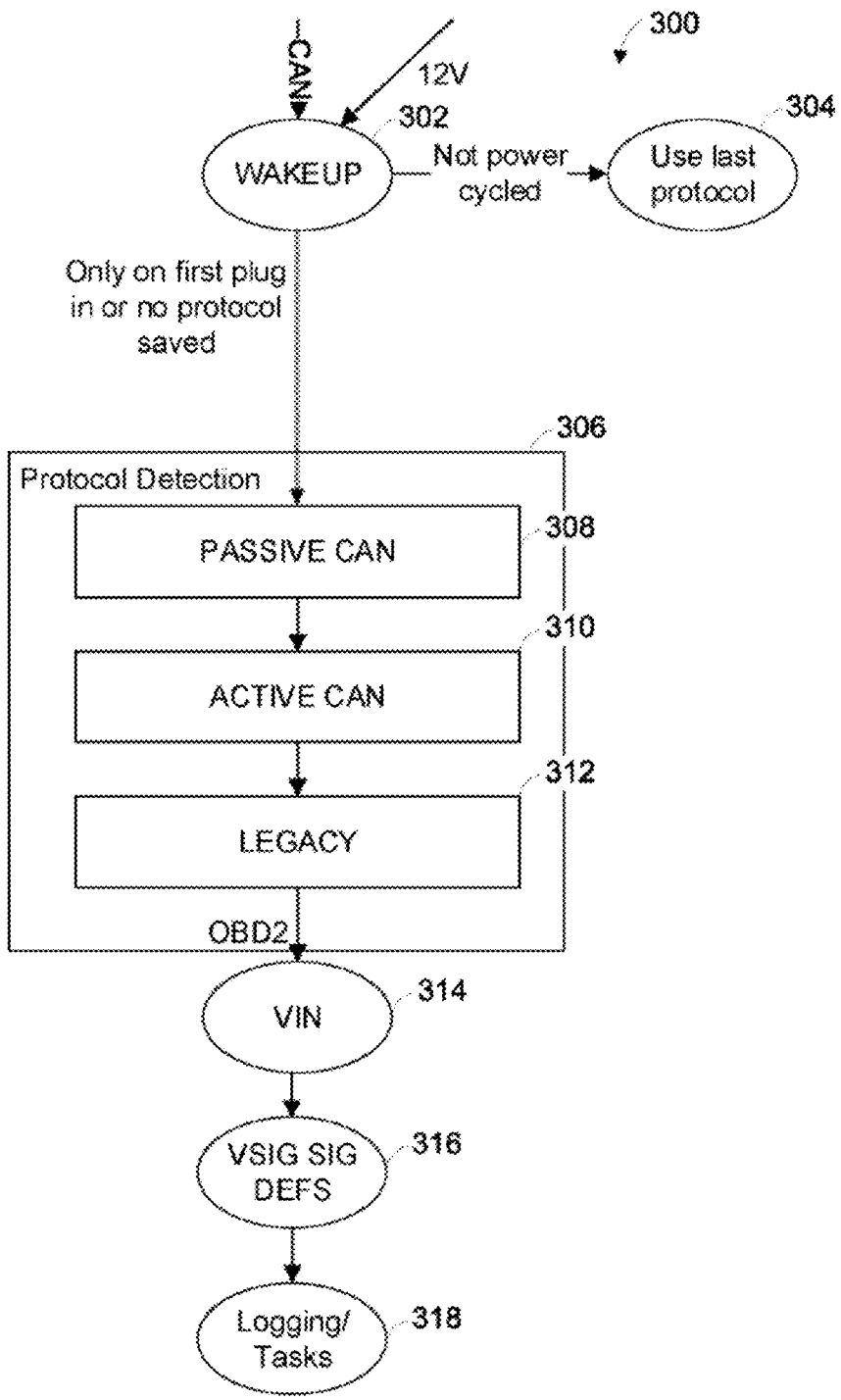

Vehicles can adopt different communication protocols, depending on the vehicle make, model, and/or year. Some communication protocols may be compliant with the OBD2 standard. Turning now to FIG. 4, illustrated therein is a conventional method 300 for using a telematics device to identify the vehicle 104 when the communication protocol supported by the vehicle 104 is OBD2 compliant.

At 302, the telematics device can be woken up when power is applied and the telematics device is connected to the vehicle. Where the telematics device is not power cycled (e.g., unplugged from the electric vehicle 104 and then re-plugged in), the protocol last used by the telematics device is also used at 304.

Where the telematics device is first attached to the vehicle 104, or where no protocol is saved, the telematics device detects the protocol at 306. A CAN bus baud rate is identified, and, at 308, for each baud rate, the telematics device listens for passive identification of the CAN bus. Where the vehicle 104 has a data gateway, the telematics device 106 actively identifies the CAN bus, at 310. At 312, legacy OBD2 protocols are detected, such as K-Line (ISO 9141, KWP), SAE J1850-PWM, and SAE J1850-VPW protocols. At 314 the VIN is identified, at 316 the VSIG signature definitions are returned and, at 318 logging and tasks are performed.

Figure 5:
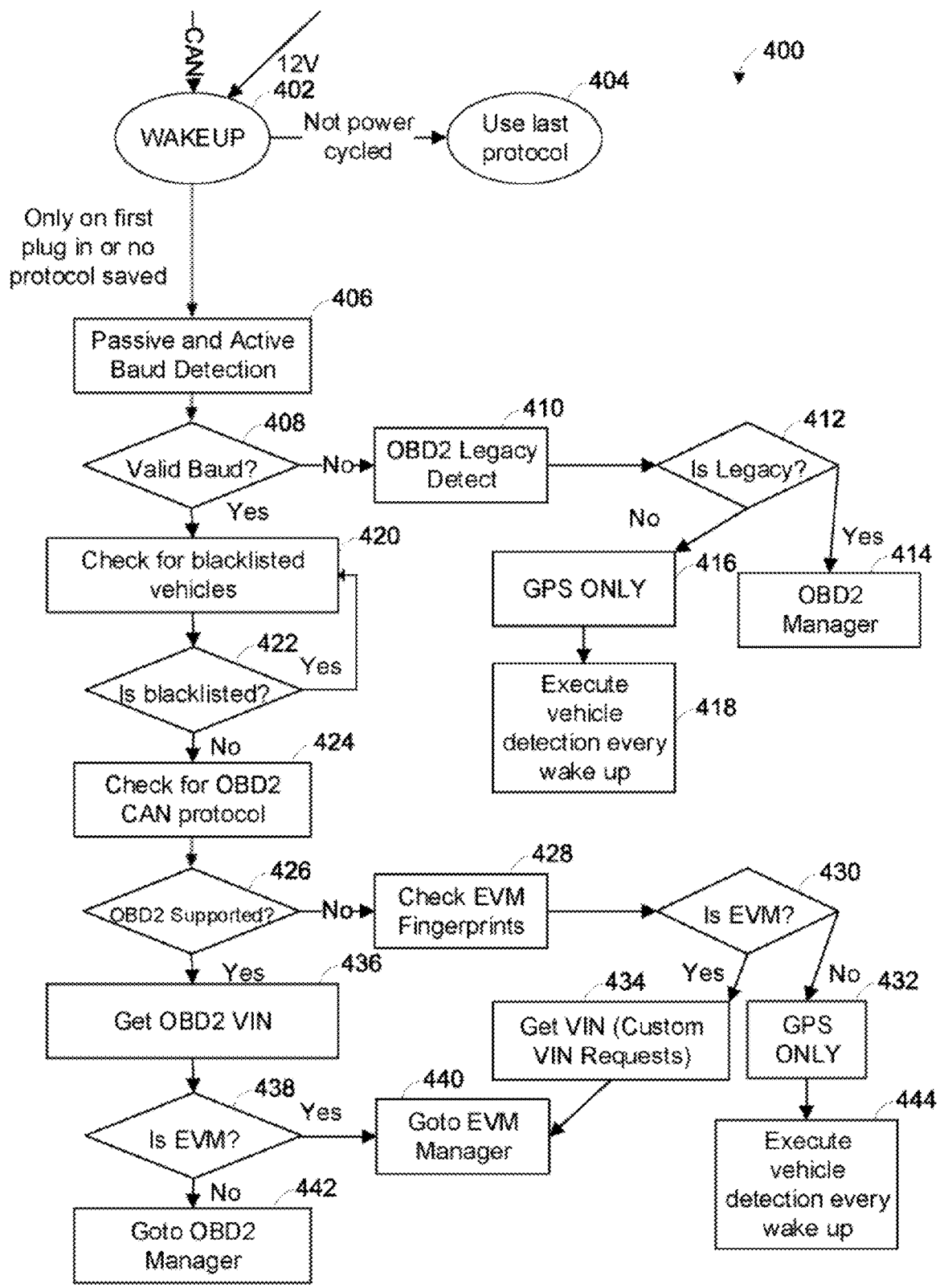

Turning now to FIG. 5, illustrated therein is a method 400 for using the telematics device 106 to identify the vehicle 104, in accordance with an embodiment. Similar to 302, at 402 the telematics device 106 can be woken up with the application of power and connection to the vehicle. For illustrative purposes only, FIG. 5 shows 12 Volts (V) and a connection to a CAN bus. However, it will be understood that other embodiments can use different power levels and connect to different communication networks on-board a vehicle. Where the telematics device 106 is not power cycled (e.g., unplugged from the electric vehicle 104 and then re-plugged in), the protocol last used by the telematics device 106 can also be used at 404, similar to 304. Where the telematics device 106 is first attached to the vehicle 104, or where no protocol is saved by the telematics device 106, the telematics device 106 can attempt to detect the communication protocol of the vehicle 104.

Similar to 308 and 310, the CAN bus baud rate can be identified at 406. The CAN bus baud rate is first identified passively. Since there are a limited number of valid potential baud rates, each potential baud rate is checked in sequence to determine if it is the baud rate of the CAN bus. For example, the telematics device 106 is configured to listen to pre-existing broadcast data on the CAN bus at a first potential baud rate and capture a portion of this data for a pre-determined interval. The pre-existing broadcast data can be broadcast from vehicle controllers. If data captured in the pre-determined interval is valid, then the telematics device 106 determines that the is the baud rate of the CAN bus. If the data captured in the pre-determined interval is not valid, then the telematics device 106 determines that the first potential baud rate is not be the baud rate of the CAN bus and the telematics device 106 checks another potential baud rate. However, such passive identification of the CAN bus baud rate requires pre-existing broadcast data on the CAN bus, which is not available for vehicles having a data gateway.

For vehicles having a data gateway, only the telematics device 106 and the data gateway are on the CAN bus. Instead, the telematics device 106 can actively identify the CAN bus baud rate in vehicles 104 that have a data gateway. To actively identify the CAN bus baud rate, the telematics device 106 also tests each valid potential baud rate in sequence. However, with active identification, the telematics device 106 transmits a few test messages to the CAN bus at a first potential baud rate. If the test messages are acknowledged by the data gateway, the telematics device 106 determines that the CAN bus baud rate is the first potential baud rate. If the test messages are not acknowledge by the data gateway, the telematics device 106 determines that the CAN bus baud rate is not the first potential baud rate and proceeds to test another potential baud rate.

The telematics device 106 can determine, at 408 if there is a valid baud. If there is not a valid baud, the telematics device 106 detects, at 410, if the vehicle 104 supports any of the legacy OBD2 protocols, similar to 312. If the telematics device 106 determines that the vehicle 104 supports a legacy OBD2 protocol at 412, the OBD2 manager is triggered at 414. The OBD2 manager allows for the retrieval of data from OBD2 compliant vehicles. That is, the OBD2 manager provides a data definition set in accordance with the OBD2 standards. In addition, the OBD2 manager can provide specifics for determining a mode of an OBD2 compliant vehicle, namely detection of the vehicle 104 being on or off.

If the telematics device 106 determines that the vehicle 104 does not support a legacy OBD2 protocol, the vehicle 104 enters a GPS only mode at 416. In the GPS only mode, the vehicle communication protocol detection can be executed at every wake up at 418.

Where there is a valid baud, at 408, the telematics device 106 checks for blacklisted vehicles, at 420. Where the vehicle 104 is blacklisted, at 422, the telematics device 106 returns to the blacklist check, at 420. The blacklist can identify vehicles that require special procedures. For example, some vehicles sound an audible alarm when a device, such as the telematics device 106, attempts to communicate with the vehicle when the doors are locked. In this case, the telematics device 106 can be configured to not communicate with the vehicle when the doors are locked in order to avoid sounding the audible alarm. Thus, the blacklist can identify exceptions so that the telematics device 106 can carry out special procedures when an exception is identified.

Where the vehicle 104 is not blacklisted, at 422, the telematics device 106 can check whether the vehicle 104 supports the OBD2 CAN protocol, at 424. At 426, the telematics device 106 can determine if the OBD2 CAN protocol is supported.

If the OBD2 CAN protocol is not supported, the telematics device 106 can check for electric vehicle fingerprints, at 428. That is, at 428, the telematics device 106 can obtain data from a serial network on-board the electric vehicle 104 and compare the data obtained with the plurality of stored fingerprints.

If, at 430, the data obtained from the serial network on-board the vehicle 104 does not match a stored fingerprint, it can be said that the vehicle 104 is not "fingerprintable". In this case, the telematics device 106 can enter GPS only mode. Similar to 416 and 418, once in GPS only mode, the telematics device 106 executes the vehicle communication protocol detection at every wake up 444.

If the vehicle 104 is an electric vehicle, that is, if the data obtained from the serial network on-board the vehicle 104 matches a stored fingerprint, the method 400 proceeds to identify the vehicle 104 at 343, which can involve a vehicle identification instruction set. That is, a vehicle identification instruction set can be obtained and executed at 343. Following identification of the vehicle 104, the telematics device 106 can enter the electric vehicle manager, at 440.

Where the vehicle 104 supports the OBD2 protocol at 426, the OBD2 VIN can be retrieved at 436, similar to 314. The telematics device 106 can store a list of VINs that correspond to an electric vehicle. At 438, the telematics device 106 can determine if the VIN retrieved at 436 corresponds to an electric vehicle by matching the retrieved VIN to the stored list of VINs. Where the VIN corresponds to an electric vehicle, the telematics device 106 can enter the electric vehicle manager, at 440. Where the VIN does not correspond to an electric vehicle, the telematics device 106 can enter the OBD2 manager, at 442.

The data definition set obtained from the VSIG provides the telematics device 106 with information to collect data from the vehicle 104 and transition through the various modes. There are a number of signal attributes that the telematics device 106 can use to accurately parse and calculate local electric vehicle data. The telematics device 106 can identify when signals are valid. The telematics device 106 can identify in what modes the telematics device 106 can transmit local vehicle data to the server 110 and at what rates.

The data definition set may include metadata about each signal definition, including: signal validity criteria, maximum value allowed, minimum value allowed, and default value after signal hits timeout. As well as signal timeout values, time after signal reverts to default value, signal value type, and physical protocol specifications. The VSIG database architecture may be compatible with OBD2, J1939, J1587, UDS, KWP, Transport Protocol, ISO15765-2, BMW-TP, and other protocols.

The data definition set may include saturation limits for signal scaling (i.e. useable versus actual battery state of charge (SOC)), maximum saturation limit, minimum saturation limit, and mode transmit limits for signals (i.e. for UDS type request signals).

The data definition set may include specifications for each signal such as maximum and minimum transmit limits for each signal request for each vehicle mode (e.g. Scanning. Driving, Charging).

The data definition set may include global vehicle parameters. The global vehicle parameters may include global minimum or maximum transmit rates.

The telematics device 106 can also include an user interface to receive input defining the local vehicle data obtained or collected from vehicle by the telematics device 106 in real-time, the collection rate of the local vehicle data, the local vehicle data to be transmitted from the telematics device 106 to the server 110 in real-time, as well as the transmission rates of the local vehicle data.

In an embodiment, the telematics device 106 can be configured to collect and transmit the following local vehicle data to the server 110: vehicle speed and odometer. The telematics device 106 can be configured to also include a logging rate and a signal delta in the transmission of each of a vehicle speed and odometer.

The telematics device 106 can define real-time update rates by mode. In some embodiments, the telematics device 106 may minimize data usage. For example, in some embodiments, the telematics device 106 may transmit signals only when the signal changes. In other embodiments, the telematics device 106 may transmit signals at a predefined transmission rate.

Updates to VSIG Configuration may be completed as in Table B.

TABLE B

| | Real-time Update Rates | | |
| --- | --- | --- | --- |
| Signal Name | Moving Mode | Idling Mode | Charging Mode |
| GPS | Distance: 100 m | Rate: 60 s | Rate: 300 s |
| Vehicle Speed | Rate: 1 s | | |
| HV Battery State of Charge | Rate: 10 s | Rate: 30 s | Rate: 60 s |
| Charger Power | | | Rate: 30 s |
| Battery Temperature | | | |
| Engine Hours | End of Trip | | |
| Seatbelt Status | Signal Delta: 1 | | |
| OBD2 DTCs | Signal Delta: 1 | | |

The telematics device 106 can be configured to include any one or more of data relating to real-time update, rates, allowing the system to configure the rate of raw data in any vehicle mode, and as a function of the time elapsed or the distance the vehicle 104 has travelled, or upon specific vehicle events.

Figure 6:
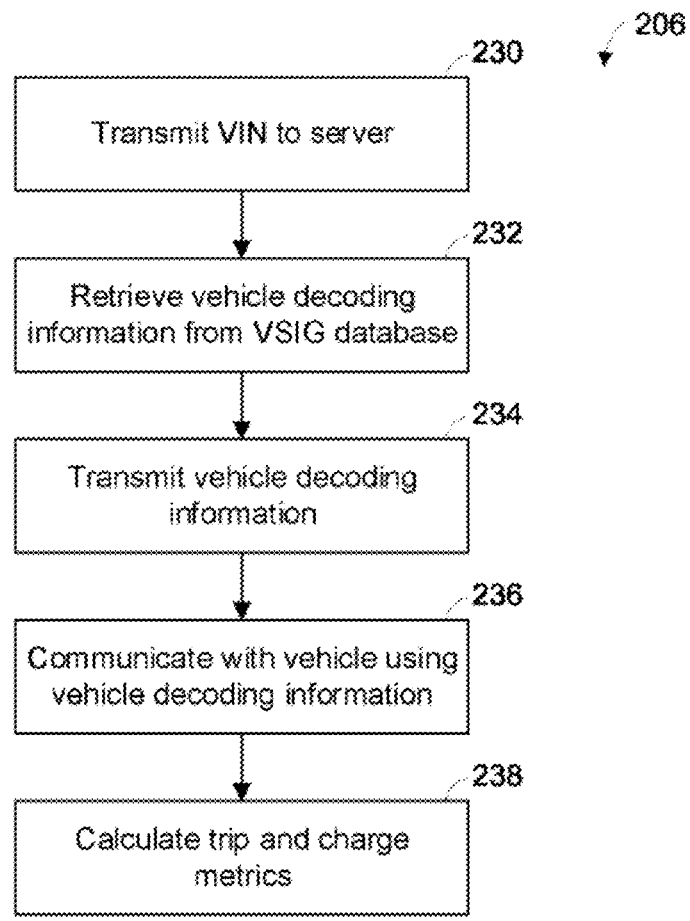
FIG. 6 is a flow chart of a method for remote configuration management of an electric vehicle, in accordance with an embodiment.

Turning now to FIG. 6, illustrated therein is a method for remote configuration management 204, in accordance with an embodiment. During remote configuration management 204, the data definition set is obtained using the vehicle identification obtained from 204.

For electric vehicles that are plug-in vehicles, the electric vehicle data includes any one or more of battery state of charge, vehicle plug in status, vehicle current charging status, battery power, electrical current of the battery, electrical voltage of the battery, vehicle speed, vehicle fuel rate, and odometer value. The electric vehicle information may be available at the physical OBD2 port. However, the digital location of the electric vehicle information may be different for each make, model, and year of vehicle.

Once the telematics device 106 has retrieved a VIN (at 220) using the fingerprinting method 202, the communications module 116 transmits the VIN, at 230, to the server 110 via the network 112 (e.g., the Internet).

The server 110 includes the vehicle signals database (VSIG) and, at 232, the data definition set is retrieved from the VSIG database. At 234, the retrieved data definition set is transmitted from the server 110 to the telematics device 106.

The data definition set can include any one or more of: CAN bus signal definitions, including CAN identifiers, start and end bits, and scaling and offset factors, and request and response definitions that detail which parameters to request from the vehicle, and information on how to interpret the vehicle's response.

Once the telematics device 106 has received the data definition set, the telematics device 106 is able to communicate at 326, via the OBD2 port 108, with the electric vehicle 104. The telematics device 106 uses the data definition set to communicate with the electric vehicle 104. At 238, the telematics device 106 calculates trip and charge metrics for the electric vehicle 104.

During a driving event for the electric vehicle, the telematics device 106 calculates various metrics. At the conclusion of the trip, the telematics device 106 uploads the overall metrics for the event. For example, the trip metrics may include any one or more of Trip Start time, Trip Duration, Total Idle Time, Total Distance, Starting Odometer, Ending Odometer. Outside Temperature, Total Fuel Consumed, Idle, Fuel Consumed, Starting Battery State of Charge, Ending Battery State of Charge, Distance driven on Electricity, Number of Idling events, Number of hard braking events, Number of hard acceleration events, Average Speed, and Maximum Speed.

Charge metrics summarize the details of the charging event and the telematics device 106 uploads the charge metrics to the server at the end of the event. Charge metrics may include any one or more of Charge Start time, Charge Duration, Maximum Charging Power (Watts), Total Charging Energy, Estimated Charging Losses, Starting Battery State of Charge, Ending Battery State of Charge. GPS Latitude, GPS Longitude, GPS Altitude, and Charge Energy Interval Data.

The telematics device 106 calculates the total energy entering the vehicle 104 via the charge plug during a periodic (e.g., 15 minute) window to determine the charge energy interval data. In some cases, a common reporting mechanism for electric utility data is "15 minute interval data".

The telematics device 106 calculates the trip and charge metrics with a relevant calculator, such as a driving calculator or a charging calculator. The determination of state is used to select which calculator to activate.

In addition to trip and charge metrics, the telematics device 106 may also upload live "raw" data from the vehicle 104 where the instantaneous GPS position or State of Charge of the vehicle, or speed, etc., is desired.

In certain embodiments, the telematics device 106 includes data rate profiles for live data upload. Data rate profiles change the rate of data upload to be slower during charge than for driving. This allows savings on wireless data transfer costs, since the total on hours during charge are much higher than during driving. Electric vehicles tend to spend more time charging than driving, for example 12 hours charging/day and 2 hours driving/day. The telematics device 106 receives high data rates during driving in order to monitor the location of the vehicles when driving. During a charge, not much of interest is happening as the state of charge goes up slowly.

In some cases, no matter how long the duration of a charge is, the telematics device 106 uploads a single charge metrics package. The charge metrics package may have a fixed size.

Figure 7:
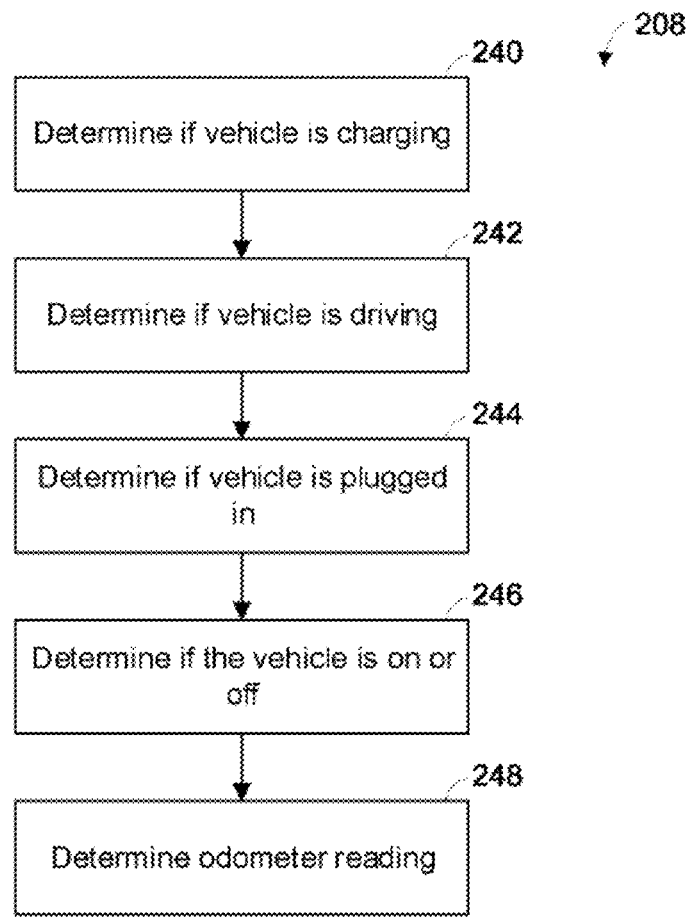
FIGS. 7 and 8 are flow charts of a method for vehicle mode detection for an electric vehicle, in accordance with an embodiment.

Referring now to FIG. 7, illustrated therein is the vehicle mode detection method 206, in accordance with an embodiment. Once the telematics device 106 is able to communicate with the electric vehicle 104 by using the remote configuration management method 204, the telematics device 106 may determine operating modes for the electric vehicle. The telematics device 106 uses the vehicle diagnostic data to determine in which mode the vehicle 104 operates (for example, driving, charging, off, or plugged in).

At 240, the telematics device 106 determines if and/or when the electric vehicle 104 is charging to determine an electric vehicle charging mode. The determination of the charging mode may be performed using the method 700 of FIG. 10.

At 242, the telematics device 106 determines if and/or when the electric vehicle 104 is driving to determine an electric vehicle driving mode. The determination of the driving mode may be performed using the method 800 of FIG. 11.

At 244, the telematics device 106 determines if the electric vehicle 104 is plugged in to a charging source. The charging source may be, for example, an electric supply grid.

At 246, the telematics device 106 determines if the electric vehicle 104 is on or off. Where power is being supplied from the power system of the electric vehicle 104 to the driving system of the electric vehicle 104, the electric vehicle 104 is on. Where power is not being supplied from the power system to the driving system, the electric vehicle is off.

The telematics device 106 may not directly make an on/off determination. For example, if the vehicle 104 wakes in the middle of the night to call the manufacturer with diagnostics, it is not on. In this case, the telematics device 106 wakes up upon detecting runtime CAN bus traffic, but since the telematics device 106 does not detect that the vehicle 104 is charging or driving, the telematics device 106 waits in the scan mode for either the CAN bus to go silent (upon the telematics device 106 will go to sleep), or the vehicle 104 to start driving or charging.

At 248, the telematics device 106 determines the odometer reading of the electric vehicle 104. Once the data definition set is obtained from VSIG, then the odometer is read periodically during driving and attached to end of trip metrics.

Figure 8:
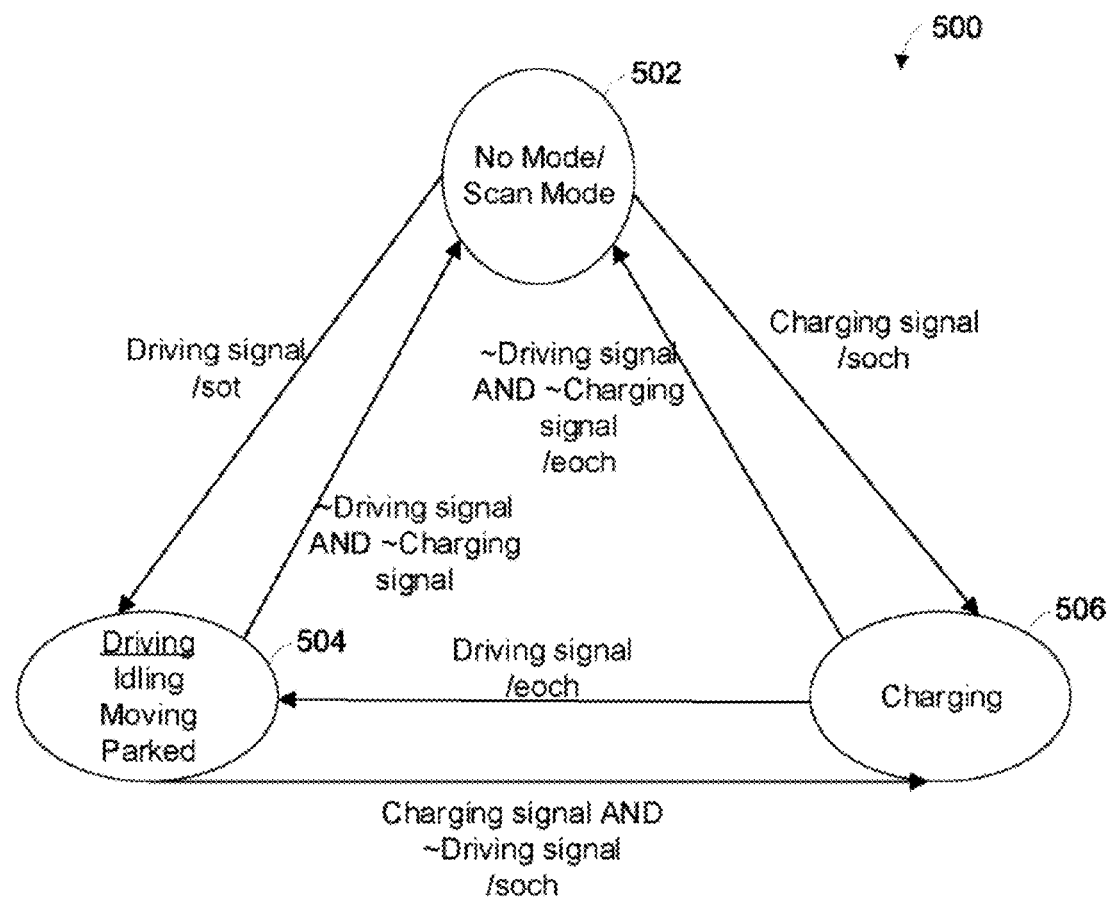

Referring now to FIG. 8, illustrated therein is a vehicle mode determination method 500, in accordance with an embodiment. The first vehicle determination has occurred and data definitions set has been retrieved from the server.

The telematics device 106 can obtain a vehicle speed, a battery power, an engine speed (rpm). Optionally, the telematics device 106 can obtain a charger power, a signal indicating that the vehicle 104 is driving (herein referred to as a "driving signal") and a signal indicating that the vehicle 104 is charging (herein referred to as a "charging signal"). If a driving signal is not available from the vehicle 104, the driving module 122 can operate in accordance with FIG. 10 to determine if the vehicle 104 is driving. If a charging signal is not available from the vehicle 104, the charging module 124 can operate in accordance with FIG. 11 to determine if the vehicle 104 is charging.

The high level state determination is separated into a scan mode 502, a driving mode 504, and a charging mode 506. The scan mode 502 is where the state of the vehicle 104 is not yet determined, or it is a nuisance wakeup, or some other event. The driving mode 504 is where the vehicle 104 is considered to be in a drive ready state. The vehicle 104 could be idling, moving, parked. For example, if a user is sitting in the car, the user would expect the drive ready light to be lit on the vehicle's dashboard. The charging mode 506 is where the vehicle 104 is currently plugged in and charging the battery.

Figure 9:
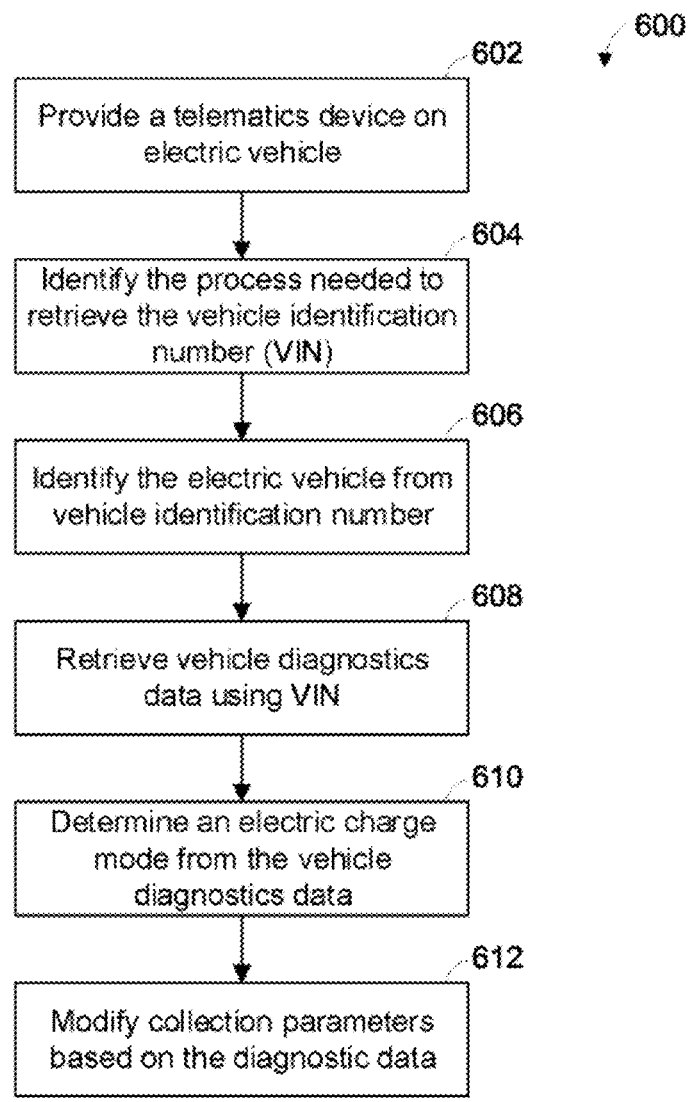
FIG. 9 is a flow chart of a method for managing a fleet of electric vehicles, in accordance with an embodiment.

Turning now to FIG. 9, illustrated therein is a method 600 for managing a fleet of electric vehicles. The method 600 includes, at 602, providing a telematics device 106 on each electric vehicle. Providing a telematics device 106 can involve connecting the telematics device 106 to the vehicle 104 via an OBD2 port. The method 600 includes, at 604, identifying the process (e.g., as described with reference to FIGS. 3 through 6) needed to retrieve the vehicle identification number (VIN). The method 600 includes, at 606, identifying the electric vehicle with the telematics device 106 using the VIN. The method 600 includes, at 608, using the VIN to retrieve vehicle diagnostic data from a remote server. The method 600 includes, at 610, using the vehicle diagnostic data to determine which mode the vehicle 104 operates (driving, charging, off, or plugged in).

The method 600 includes, at 612 modifying collection parameters. The behavior of collection is modified in a variety of ways. For example, which signals are collected, how the telematics device 106 interacts with the vehicle, and the rate that data is requested from the vehicle. The telematics device 106 may modify rates of data capture. For instance, change is slow during charging so the rate of data capture can be lower. However, change is rapid during driving so the rate of data capture can be higher.

The method 600 can further include retrieving a data definition set from the VSIG, communicating the data definition set to the vehicle 104, and calculating trip and charge metrics.

The method 600 can further include determining the power of an on-board or off-board battery charger. The method 600 can further include determining the vehicle speed, battery power and engine speed. The method 600 can further include determining if the electric vehicle is charging. Determining this mode (driving/off/idling/charging) of the vehicle 104 is used to enforce minimum and/or maximum signal transmit rates to avoid unwanted vehicle behavior. For example, if the telematics device 106 communicates with the vehicle 104 while the vehicle 104 is "off", then the telematics device 106 may trigger the car alarm. In another example, if the telematics device 106 continues to communicate with the vehicle 104 after a drive, the telematics device 106 may keep the vehicle computer system awake and drain the 12V battery in a few hours. In these cases, the telematics device 106 can control the way and rate at which the telematics device 106 communicates with the vehicle 104 based on the vehicle mode.

Figure 10:
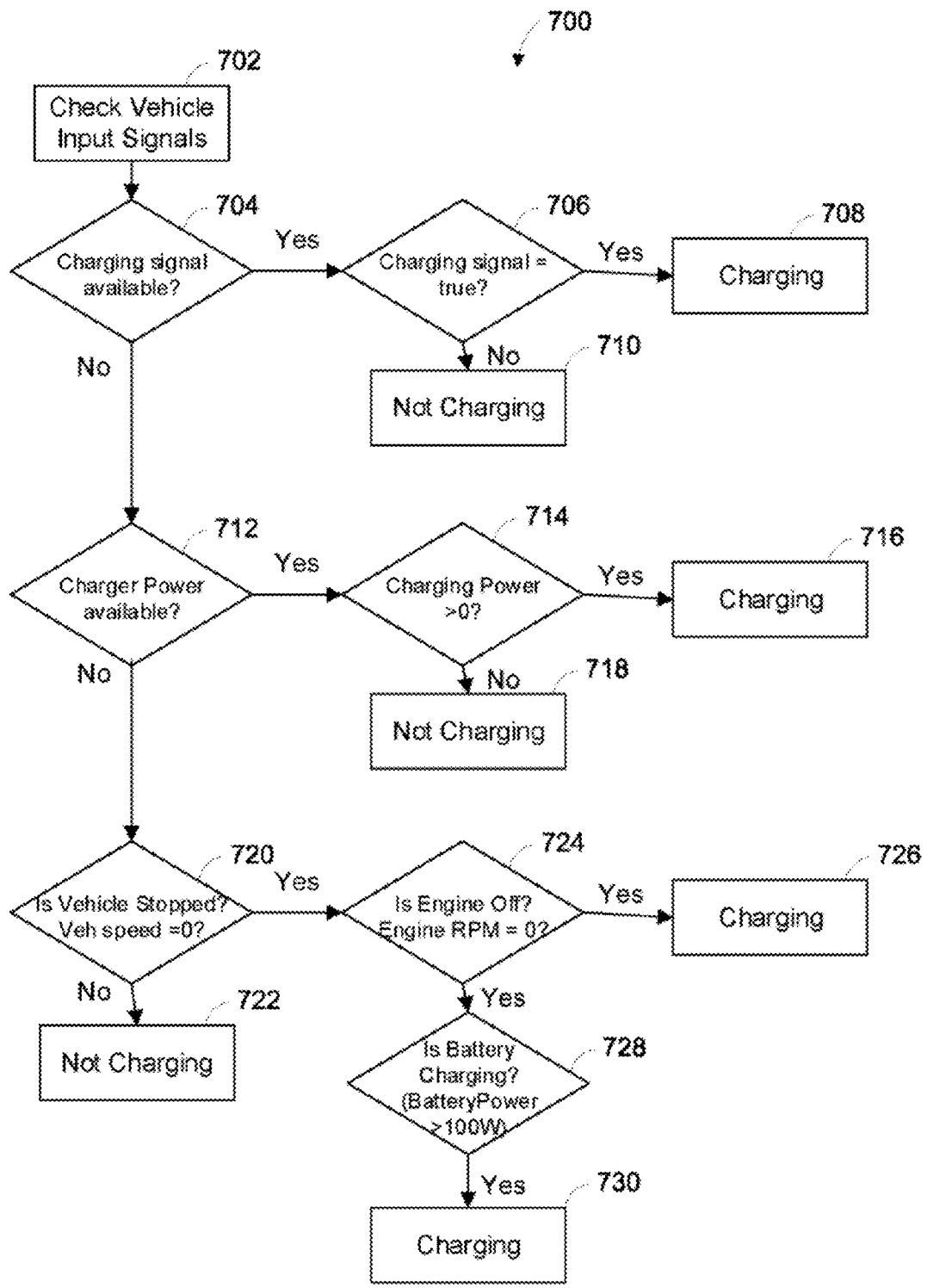
FIG. 10 is a flow chart of a method for determining if an electric vehicle is charging, in accordance with an embodiment.

FIG. 10 illustrates a method 700 for determining if the electric vehicle is charging. The method 700 can be executed by the charging module 124. There is no standard method for electric vehicles to indicate a charging state. The vehicle 104 can be inferred to be such a state using the local electric vehicle data retrieved by the telematics device 106. Charging mode data may include any one or more of charging summary calculators, charge parameters, real-time data, raw data (guaranteed), and rates and signals defined by the data definition set.

At 702, the telematics device 106 checks for explicit signals indicating that the vehicle 104 is charging. For example, some vehicle can provide an "isCharging" or "isChargingDC" signal. If, at 704 a charging signal is available (i.e. defined in data definition set), and if, at 706 the charging signal is true, then the telematics device 106 determines that the electric vehicle is charging, at 708, and if not, the telematics device 106 determines that the electric vehicle is not charging, at 710.

If a charging signal is not available, at 704, then the telematics device 106 determines from AC charger input signals, if charger power signal is available, at 712. The AC charger signals may include AC voltage, current, or AC charger power. If, at 714, the charger power is greater than zero, then the telematics device 106 determines that the electric vehicle is charging, at 716. If, at 714, charger power is zero, then the telematics device 106 determines that the electric vehicle not charging, at 718.

If the charger power is not available, at 712, the telematics device 106 determines, at 720, if the vehicle 104 is stopped. Where the vehicle speed is not zero, the vehicle 104 is determined to be not charging, at 722. Where the vehicle 104 is stopped at 720, and the engine is off, at 724, the electric vehicle is determined to be charging, at 726. Where battery power is greater than 100%, at 728, and the engine speed (rpm) is zero, or does not exist, the telematics device 106 determines that the electric vehicle is charging at 730, otherwise the telematics device 106 determines that the electric vehicle is not charging.

Figure 11:
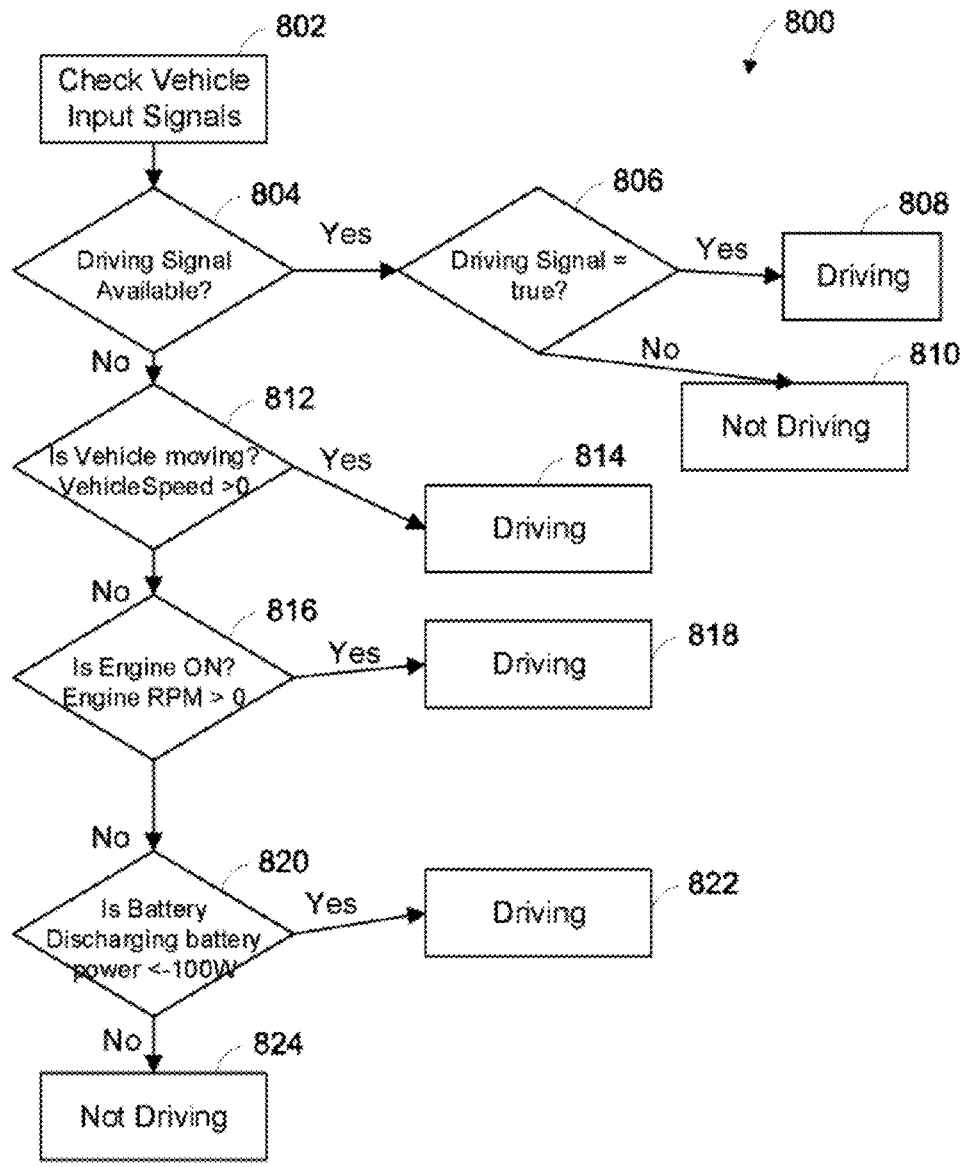
FIG. 11 is a flow chart of a method for determining if an electric vehicle is driving, in accordance with an embodiment.

FIG. 11 illustrates a method 800 for determining if an electric vehicle is driving, in accordance with an embodiment. The method 800 can be executed by the driving module 122. At 802, the telematics device 106 checks for a driving signal. Driving mode data may include any one or more of trip summary calculators, trip parameters, park event summary, real-time data, raw data (guaranteed), and rates and signals defined by the data definition set, trip data, distance, and fuel consumed.

If, at 804, a driving signal is available signal (i.e. defined in data definition set), and if, at 808 the driving signal is true, then the telematics device 106 determines that the electric vehicle is driving, at 808, otherwise the telematics device 106 determines that the electric vehicle is not driving at 810.

Where the driving signal is not available at 804, the telematics device 106 determines if the vehicle is moving, at 812. If the vehicle speed is greater than zero, the telematics device 106 determines that the electric vehicle is driving.

Where the vehicle speed is zero, at 812, the telematics device 106 determines if the engine is on, at 816. If the engine speed is greater than zero, the telematics device 106 determines that the electric vehicle is driving, at 818. Where the engine rpm is zero, at 816, the telematics device 106 determines, at 820, if the battery is discharging battery power less than −100 W (i.e., discharging great than 100 W). If so, then the telematics device 106 determines that the electric vehicle is driving at 822, otherwise the telematics device 106 determines that the electric vehicle is not driving, at 824.

In certain embodiments, if the driving signal is available it overrules other conflicting triggers.

Figure 12:
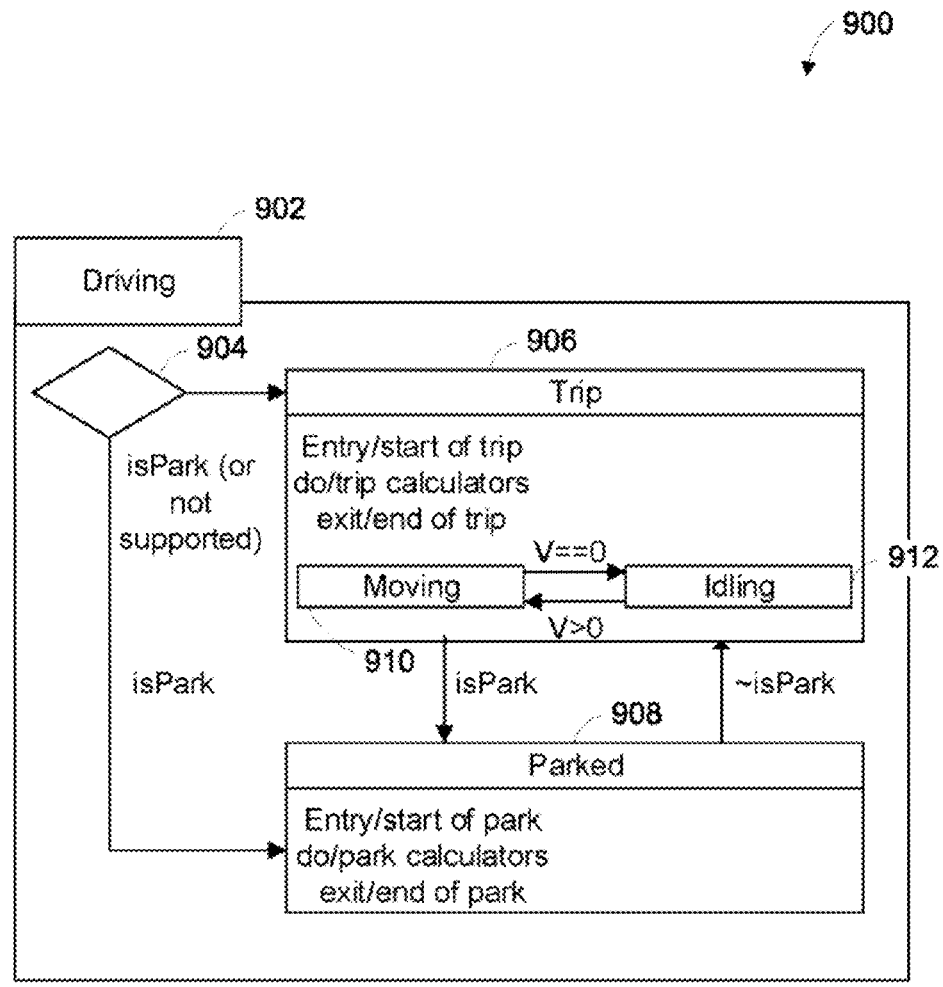
FIG. 12 is a flow chart of a method for determining trip and parking status for an electric vehicle, in accordance with an embodiment.

FIG. 12 illustrates a method 900 for determining 904 if an electric vehicle in a driving mode 902 is on a trip 906 or is parked 908, in accordance with an embodiment. The telematics device 106 looks for a signal indicating that the vehicle is parked (herein referred to as a "park signal") from the data definition set. Should a park signal be available, a trip will not begin until the vehicle has been shifted away from park. Instead a park event summary will be generated.

The telematics device 106 determines, at 904, if there is a park signal. If there is an park signal, then the telematics device 106 determines that the vehicle is parked at 908. If the vehicle speed is zero for a period of time (e.g., 5 minutes), the telematics device 106 determines that the vehicle is idling at 912. If the vehicle speed is above zero, the telematics device 106 determines that the vehicle is moving, at 910.

While the above description provides examples of one or more apparatus, methods, or systems, it will be appreciated that other apparatus, methods, or systems may be within the scope of the claims as interpreted by one of skill in the art.

The invention claimed is:

1. A method for managing a fleet of vehicles, the method comprising:
providing a telematics device for an electric vehicle of the fleet of vehicles, the telematics device being capable of obtaining electric vehicle specific non-OBD2 communication data from an OBD2 port of the electric vehicle;
using the telematics device to identify the electric vehicle based at least in part on the electric vehicle specific non-OBD2 communication data obtained from the electric vehicle by checking for an electric vehicle fingerprint and comparing the fingerprint to a plurality of fingerprints stored on the telematics device to identify a matching fingerprint, with the matching fingerprint being used to obtain a vehicle identifier to identify the electric vehicle;
once the electric vehicle has been identified, providing a data definition set for the electric vehicle to the telematics device enabling configuration of the telematics device for decoding vehicle signals; and
using the telematics device and the data definition set to decode the vehicle signals to determine whether the electric vehicle is in a vehicle mode, wherein the vehicle mode comprises at least one of a charging mode, a driving mode, and a parked mode.

2. The method of claim 1 wherein using the telematics device to identify the electric vehicle based on the electric vehicle specific non-OBD2 communication data obtained from the electric vehicle comprises:
obtaining the electric vehicle specific non-OBD2 communication data from the OBD2 port;
comparing the electric vehicle specific non-OBD2 communication data to the plurality of fingerprints stored on the telematics device, each of the plurality of fingerprints being stored in association with a vehicle identification instruction set;
identifying a vehicle identification instruction set corresponding to the matching fingerprint; and
performing the vehicle identification instruction set corresponding to the matching fingerprint to obtain the vehicle identifier for the electric vehicle.

3. The method of claim 2, wherein obtaining the electric vehicle specific non-OBD2 communication data from the OBD2 port comprises obtaining the electric vehicle specific non-OBD2 communication data from the OBD2 port for a pre-determined period of time.

4. The method of claim 2, wherein the electric vehicle specific non-OBD2 communication data obtained from the OBD2 port further comprises a payload filter of a CAN bus message.

5. The method of claim 1, wherein providing the data definition set for the electric vehicle to the telematics device comprises:
providing a server, the server storing a plurality of vehicle identifiers, the plurality of vehicle identifiers being stored in association with data definition sets;
communicating the vehicle identifier for the electric vehicle from the telematics device to the server;
locating the data definition set for the electric vehicle based on the vehicle identifier for the electric vehicle; and
communicating the data definition set for the electric vehicle from the server to the telematics device.

6. The method of claim 1 further comprising, in response to determining that the electric vehicle is in the charging mode, reducing a rate at which data is transmitted from the electric vehicle to a server.

7. The method of claim 1 further comprising, in response to determining that the electric vehicle is not in the driving mode, reducing a rate at which data is obtained from the electric vehicle.

8. The method of claim 1 further comprising, in response to determining that the electric vehicle is in the charging mode, determining charge metrics including at least one of a charge start time, a charge duration, a maximum charging power, a total charging energy, estimated charging losses, a starting battery state of charge, an ending battery state of charge, location coordinates, and a charge energy interval data.

9. The method of claim 1 further comprising, in response to determining that the electric vehicle is in the driving mode, determining trip metrics including at least one of a trip start time, a trip duration, a total idle time, a total distance travelled, a total distance travelled on electricity, a starting odometer, an ending odometer, an outside temperature, a total fuel consumed amount, an amount of fuel consumed while idle, a starting battery state of charge, an ending battery state of charge, a number of idling events, a number of hard braking events, a number of hard acceleration events, an average speed, and a maximum speed.

10. A telematics device for managing an electric vehicle, the device comprising:
an OBD2 port for obtaining electric vehicle specific non-OBD2 communication data from the electric vehicle;
a wireless communication interface for communicating with a server storing a plurality of vehicle identifiers, the plurality of vehicle identifiers being stored in association with data definition sets;
a memory operably connected to a processor and storing a plurality of fingerprints and a plurality of vehicle identification instruction sets, each fingerprint being stored in association with a vehicle identification instruction set; and
the processor configured to:
obtain the electric vehicle specific non-OBD2 communication data from the electric vehicle;
identify the electric vehicle based at least in part on the electric vehicle specific non-OBD2 communication data obtained from the electric vehicle by checking for an electric vehicle fingerprint and comparing the electric vehicle fingerprint to the plurality of fingerprints stored on the memory of the telematics device to identify a matching fingerprint, with the matching fingerprint being used to obtain a vehicle identifier to identify the electric vehicle;
once the electric vehicle has been identified, obtain a data definition set for the electric vehicle from the server to enable configuration of the telematics device for decoding vehicle signals; and
decode the vehicle signals to determine whether the electric vehicle is in a vehicle mode, the vehicle mode of the electric vehicle comprising at least one of a charging mode, a driving mode, and a parked mode.

11. The telematics device of claim 10, wherein the processor configured to identify the electric vehicle based on the electric vehicle specific non-OBD2 communication data obtained from the electric vehicle comprises the processor configured to:
obtain the electric vehicle specific non-OBD2 communication data from the OBD2 port;
compare the electric vehicle specific non-OBD2 communication data to the plurality of fingerprints stored on the memory of the telematics device, each of the plurality of fingerprints being stored in association with a vehicle identification instruction set;
identify a vehicle identification instruction set corresponding to the matching fingerprint; and
perform the vehicle identification instruction set corresponding to the matching fingerprint to obtain the vehicle identifier for the electric vehicle.

12. The telematics device of claim 11, wherein the processor configured to obtain the electric vehicle specific non-OBD2 communication data from the OBD2 port comprises the processor configured to obtain the electric vehicle specific non-OBD2 communication data from the OBD2 port for a pre-determined period of time.

13. The telematics device of claim 11, wherein the electric vehicle specific non-OBD2 communication data obtained from the OBD2 port further comprises a payload filter of a CAN bus message.

14. The telematics device of claim 10, wherein the processor configured to obtain the data definition set for the electric vehicle from the server comprises:
communicating the vehicle identifier for the electric vehicle to the server; and
receiving the data definition set for the electric vehicle from the server.

15. The telematics device of claim 10, wherein the processor is further configured to reduce a rate at which data is transmitted to the server when the electric vehicle is in the charging mode.

16. The telematics device of claim 10, wherein the processor is further configured to reduce a rate at which data is obtained from the electric vehicle when the electric vehicle is not in the driving mode.

17. A system comprising:
a server; and
a telematics device for managing an electric vehicle, the telematics device comprising:
- an OBD2 port for obtaining electric vehicle specific non-OBD2 communication data from the electric vehicle;
- a wireless communication interface communicating with the server storing a plurality of vehicle identifiers, the plurality of vehicle identifiers being stored in association with data definition sets;
- a memory operably connected to a processor and storing a plurality of fingerprints and a plurality of vehicle identification instruction sets, each fingerprint being stored in association with a vehicle identification instruction set; and
- the processor configured to:
  - obtain the electric vehicle specific non-OBD2 communication data from the electric vehicle;
  - identify the electric vehicle based at least in part on the electric vehicle specific non-OBD2 communication data obtained from the electric vehicle by checking for an electric vehicle fingerprint and comparing the electric vehicle fingerprint to the plurality of fingerprints stored on the memory of the telematics device to identify a matching fingerprint, with the matching fingerprint being used to obtain a vehicle identifier to identify the electric vehicle;
  - once the electric vehicle has been identified, obtain a data definition set for the electric vehicle from the server to enable configuration of the telematics device for decoding vehicle signals; and
  - decode the vehicle signals to determine whether the electric vehicle is in a vehicle mode, the vehicle mode of the electric vehicle comprising at least one of a charging mode, a driving mode, and a parked mode.

* * * * *